United States Patent
Watanabe et al.

(10) Patent No.: US 6,222,286 B1
(45) Date of Patent: *Apr. 24, 2001

(54) STEPPING MOTOR WITH RUST INHIBITING AND EDDY CURRENT MINIMIZING CHARACTERISTICS

(75) Inventors: Kazuyuki Watanabe, Hamamatsu; Hirofumi Nakano, Toyohashi; Toshihiko Takemoto, Tokuyama; Ryoji Hirota, Nanyou, all of (JP)

(73) Assignee: Nisshin Steel Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/738,205

(22) Filed: Oct. 25, 1996

(51) Int. Cl.⁷ .................. H02K 5/02; H02K 5/06
(52) U.S. Cl. ................. 310/49 R; 310/89; 310/257
(58) Field of Search ................... 310/49 R, 254, 310/89, 257; 148/325

(56) References Cited

U.S. PATENT DOCUMENTS 5,571,343 * 11/1996 Ryoo et al. ................... 148/335
5,662,864 * 9/1997 Kato et al. .................... 420/70

FOREIGN PATENT DOCUMENTS

| 62-135577 | 8/1987 | (JP) . | |
|---|---|---|---|
| 3-90545 | * 4/1991 | (JP) | ........... 310/49 R |
| 3-104077 | 10/1991 | (JP) . | |
| 3-283049 | 12/1991 | (JP) . | |
| 4-235289 | * 8/1992 | (JP) | ........... 310/89 |
| 7-143723 | * 6/1995 | (JP) | ........... 310/49 R |
| 7-150243 | * 6/1995 | (JP) | ........... 310/49 R |
| 47235 | * 2/1996 | (JP) | ........... 310/49 R |
| 88965 | * 4/1996 | (JP) | ........... 310/49 R |

* cited by examiner

Primary Examiner—Karl Tamai
(74) Attorney, Agent, or Firm—Evenson, McKeown, Edwards & Lenahan, P.L.L.C.

(57) ABSTRACT

In a stepping motor, stator yokes have a plurality of comb-tooth-shaped magnetic poles 5b, 6b, 7b and 8b in such a manner that the comb-tooth-shaped magnetic poles are opposed to each other coaxially to a rotor portion made from a permanent magnet magnetized to have multiple magnetic poles, and an excitation coil is fitted on the external circumference of the stator yokes and the excitation coil and the stator yokes are surrounded by a frame yoke. Each of the yokes is formed of an Fe—Cr alloy having a predetermined ferrite single-phase structure so that occurrence of eddy currents in an alternating-current magnetic field is suppressed.

8 Claims, 5 Drawing Sheets frequency-pull-out-torque characteristic

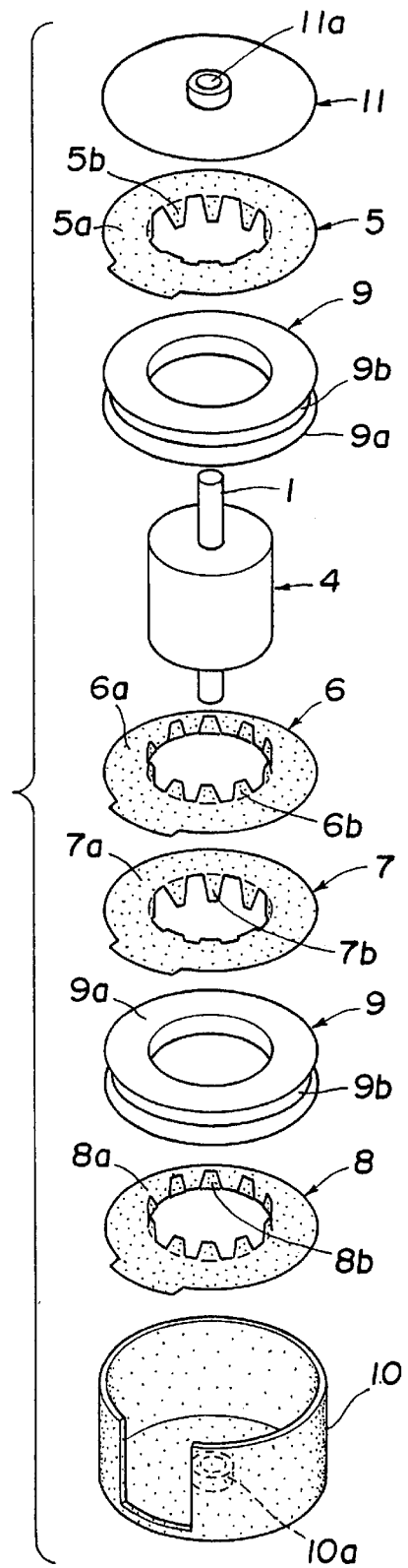
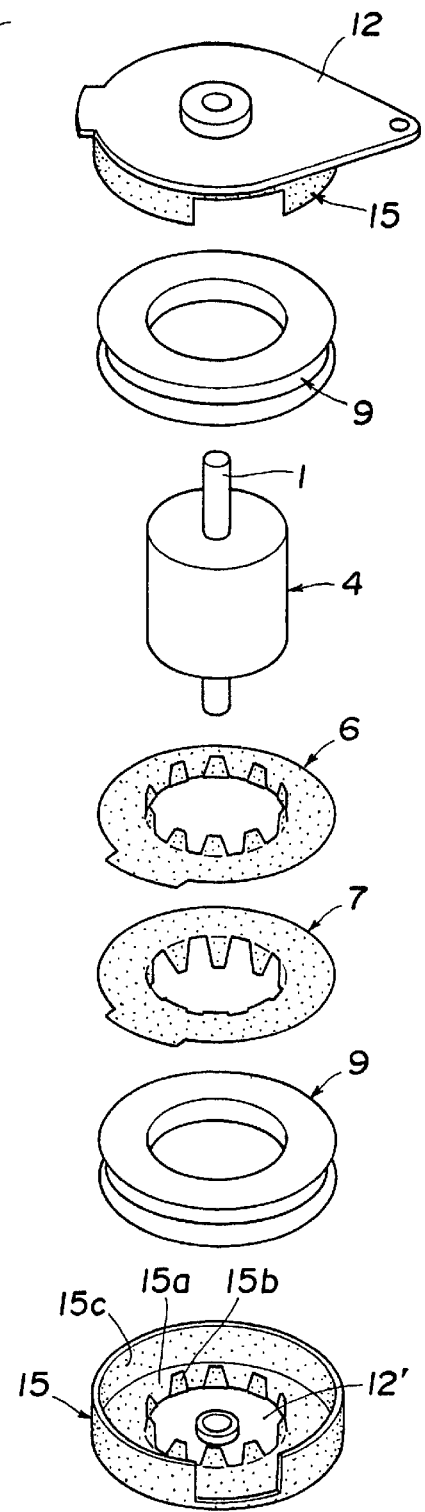
FIG. 2
FIG. 3 frequency-efficiency characteristic alternating-current magnetic flux density relative to F value ratio of magnetic flux density relative to magnetic annealing temperature alternating-current magnetic characteristic of annealed and non-annealed yoke materials FIG. 9
FIG. 10
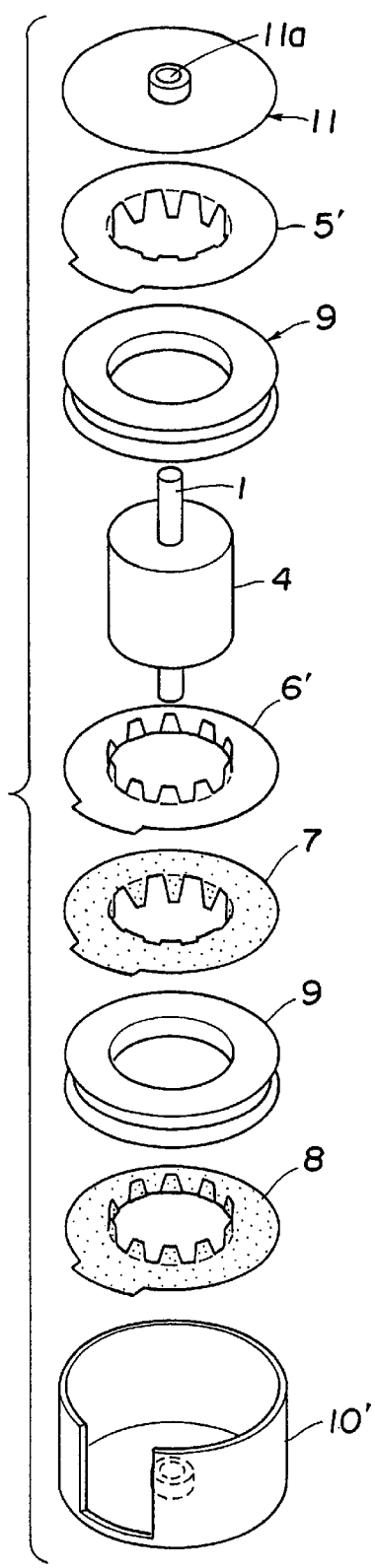
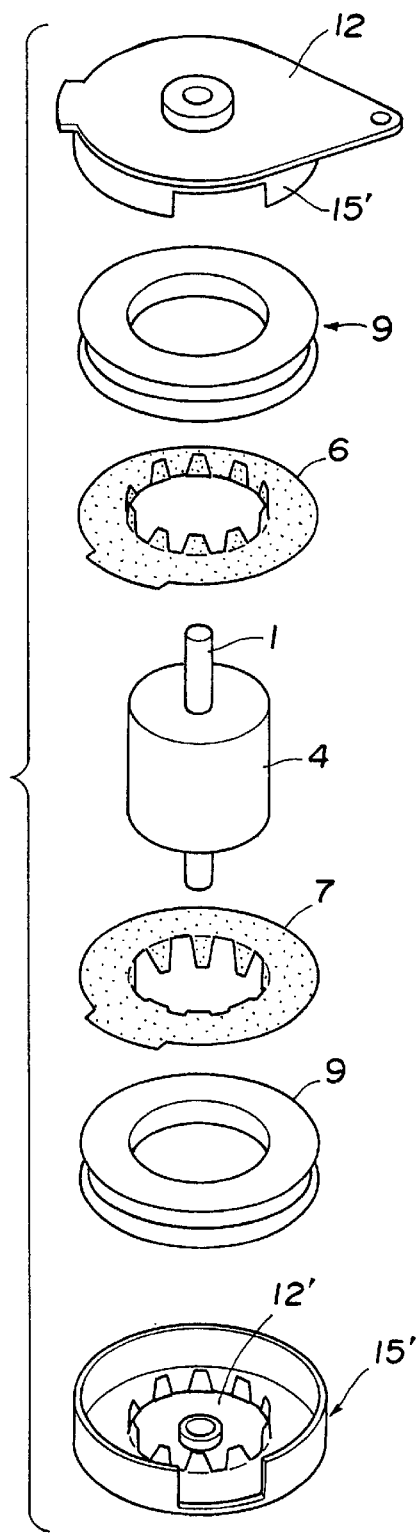

STEPPING MOTOR WITH RUST INHIBITING AND EDDY CURRENT MINIMIZING CHARACTERISTICS

BACKGROUND OF THE INVENTION

The present invention relates to a PM type of stepping motor and a method of manufacturing a yoke for use in it.

In recent years, there have been greater demands for stepping motors capable of realizing more power savings and higher outputs. In a conventional stepping motor, its stator yoke and its frame yoke are made from pure iron (soft magnetic iron plate, SUY), a cold rolled steel plate (SPC), an electrolytic zinc-coated steel (SEC) or the like. However, it has been found out that any of these materials has a superior direct-current magnetic field characteristic but shows an inferior alternating-current magnetic characteristic during driving of an actual motor. In other words, if such a plate material is subjected to a varying magnetic field, its electrical resistivity becomes low and a large number of eddy currents occur, so that its iron loss becomes remarkably large. As a driving frequency becomes higher, the iron loss becomes more remarkable. This causes a lowering in the efficiency of a stepping motor, and becomes a bottleneck which hinders an improvement in the efficiency which is needed for promoting the battery driving of office automation equipment.

To solve the above conventional problem, various proposals have been made, such as proposals to employ silicon steel or soft ferrite for a stator yoke or a frame yoke (Japanese Utility Mode Laid-Open Nos. 3-104077/1991, 62-135577/1987 and the like) or a proposal to form through-holes in part of a stator yoke (the flow passage of eddy currents) (Japanese Patent Laid-Open No. 3-283049/1991).

However, the above-noted conventional stepping motors respectively have problems which will be described below, and none of the stepping motors can completely solve the problem of efficiency lowering due to eddy currents.

Specifically, the silicon steel is difficult to work by bending (drawing) compared to the aforesaid SUY and SPC, and is further difficult to treat by rust preventive plating. To improve the workability of the silicon steel, the amount of Si to be added may be decreased. However, in this case, the obtained electrical resistivity will lower and an eddy-current decreasing effect will be lost.

The use of soft ferrite can only provide a low saturation magnetic flux density which is not more than one-third of that obtainable from SUY or SPC, so that no sufficient output torque can be obtained. In addition, the soft ferrite cannot be bent and its mechanical strength is week, and, further, it is not suitable for precision machining.

In the arrangement in which through-holes are formed in part of a stator yoke, as the number of through-holes formed increases, the output torque tends to lower, and the number of working steps increases and a cost increase is incurred. In addition, although the through-holes are formed in a portion other than comb-tooth-shaped magnetic poles, no substantial effect can be obtained because of the absence of major variations in magnetic flux or major eddy-current loss in such portions.

The present invention has been made in light of the above-described background, and its object is to provide a stepping motor which is capable of solving the above-described problems and of minimizing eddy currents and providing highly efficient and stable characteristics, and which has good workability, as well as to provide a method of manufacturing a yoke for use in the stepping motor.

To achieve the above object, a stepping motor according to the present invention comprises a rotor made from a permanent magnet magnetized to have multiple magnetic poles, a stator yoke having a plurality of comb-tooth-shaped magnetic poles and opposed coaxially to the rotor, an excitation coil fitted on an external circumference of the comb-tooth-shaped magnetic poles of the stator yoke, and a tube-shaped frame yoke which surrounds the excitation coil and the stator yoke, and at least part of the yoke is formed of an Fe—Cr alloy which essentially consists of Fe and contains 9.0–18.0 wt % Cr and trace additions which are not more than 0.02 wt % C, not more than 0.7 wt % Si, not more than 0.7 wt % Mn, not more than 0.04 wt % P, not more than 0.005 wt % S, not more than 0.5 wt % Ni, not more than 0.02 wt % N, not more than 0.01 wt % 0, not more than 4.0 wt % Al, the Fe—Cr alloy having a ferrite single-phase structure whose F value defined by the following expression is not less than 0 and not more than 8.

$$F\ value = Cr + Si + 2.1Al - 37.0(C+N) - 2.0Ni - 0.6Mn - 10.8$$

(where the unit of each composition is wt %.)

In another aspect of the invention, at least part of the yoke is formed of an Fe—Cr alloy which essentially consists of Fe and contains 9.0–18.0 wt % Cr and trace additions which are not more than 0.02 wt % C, not more than 0.7 wt % Si, not more than 0.7 wt % Mn, not more than 0.04 wt % P, not more than 0.005 wt % S, not more than 0.5 wt % Ni, not more than 0.02 wt % N, not more than 0.01 wt % 0, not more than 4.0 wt % Al and 0.01–0.4 wt % Ti, the Fe—Cr alloy having a ferrite single-phase structure whose F value defined by the following expression is not less than 0 and not more than 8.

$$F\ value = Cr + Si + 2.1(Al+Ti) - 37.0(C+N) - 2.0Ni - 0.6Mn - 10.8$$

(where the unit of each composition is wt %.) The F value is an index of the structure stability of ferritic stainless steel. If the F value has a minus sign, no stable ferrite structure is obtained and no good magnetic characteristic is obtained. Therefore, the F value needs to be greater than 0. However, as the F value becomes larger, the magnetic flux density of the ferritic stainless steel becomes lower and a motor characteristic is lowered. An experiment has shown that the upper limit of the F value is 8.0. Therefore, the F value is limited to a range between 0 and 8.

Cr is an element indispensable for ensuring the anticorrosion characteristic required for the stepping motor. If the Cr content is less than 9.0 wt %, the stepping motor cannot have rust preventive performance which is needed in normal use environments. On the other hand, if a large amount of Cr is contained, the magnetic flux density becomes low and the magnetic characteristic is degraded. If the Cr content exceeds 18.0 wt %, no desired motor performance can be obtained. Therefore, the Cr content is limited to not less than 9.0 wt % and not more than 18.0 wt %.

The reason why the respective contents of the trace additions are limited to the aforesaid ranges is as follows. At present, any of the trace additions is an inevitable impurity which cannot be completely eliminated during manufacture of the Fe—Cr alloy. However, if the trace additions can be completely eliminated, as long as the F value is satisfied, the content of a predetermined substance may be zero, i.e., the predetermined substance may not be added.

From among the inevitable impurities, C, P, S, Ni, N and O are elements that degrades magnetic characteristics, and anticorrosion property. Therefore, it is desirable to eliminate those elements. On the basis of the results of various experiments, the upper limit values of the contents of the undesirable elements were determined as described below for desired characteristics suited to the stepping motor.

C easily forms a carbide to degrade the magnetic characteristic and the anticorrosion characteristic The upper limit of the C content is set to 0.02 wt %, because if the C content exceeds 0.02 wt %, the performance required for the stepping motor which is a final product cannot be obtained P is an element which degrades the magnetic characteristic, and if the P content exceeds 0.04 wt %, the performance required for the stepping motor which is a final product cannot be obtained. For this reason, the upper limit of the P content is set to 0.04 wt %. Since S is an impurity element which easily forms a sulphide and degrades the magnetic characteristic, the S content needs to be suppressed. The upper limit of the S content is set to 0.005 wt %, because if the S content exceeds 0.005 wt %, no desired motor performance can be obtained. Ni is an austenite generating element which degrades the magnetic characteristic, and the limit of the Ni content is set to 0.5 wt %, because if the Ni content exceeds 0.5 wt %, no desired motor performance can be obtained. Since N easily forms a nitride together with Al, Ti or the like and degrades the magnetic characteristic, the N content needs to be suppressed. The upper limit of the N content is set to 0.02 wt %, because if the N content exceeds 0.02 wt %, no desired performance can be obtained. Since 0 is an impurity element which easily forms an oxide and degrades the magnetic characteristic, the 0 content needs to be suppressed. The upper limit of the 0 content is set to 0.01 wt %, because if the 0 content exceeds 0.01 wt %, no desired motor performance can be obtained.

Although Si, Mn, Al and Ti are also contained as trace inevitable impurities, they are positively added to realize the desired characteristics, or to ensure the stability of the composition, or to meet the requirements of manufacturing processes.

Since Mn is an element which is needed for deoxidation to be conducted during steel manufacture, it is preferable to add Mn by a predetermined amount. However, Mn is an element which degrades the magnetic characteristic. If the Mn content exceeds 0.7 wt %, the deoxidation effect is saturated and no predetermined motor performance is obtained. Therefore, the upper limit of the Mn content is set to 0.7 wt %.

Al is an element to be added as a deoxidizing agent, and has the action of decreasing impurities through deoxidation to improve the magnetic characteristic. The upper limit of the Al content is set to 4.0 wt %, because if the Al content exceeds 4.0 wt %, the magnetic characteristic is lowered.

Ti is an element which forms a carbide and a nitride together with C and N and is useful for ensuring the ferrite single-phase structure. Even if an extremely small amount of Ti is added, a remarkable effect can be obtained. Therefore, 0.01 wt % or more Ti improves the stability of the composition (F value) and mass-productivity.

However, if the Ti content exceeds 0.4 wt %, the aforesaid effect is saturated and the merit of the addition of expensive Ti is lost. Therefore, the upper limit of the Ti content is set to 0.4 wt %.

Si is an element which is needed for deoxidation during steel manufacture, similarly to Mn, and is also a ferrite generating element, similarly to Ti. Accordingly, although it is desirable to add a predetermined amount of Si for the same reason as each of the aforesaid elements, the contents of C, N, Mn and Ni in a steel according to the present invention are made smaller than in normal steel, so that an excess amount of Si need not be added and the addition of approximately 0.7 wt % Si is sufficient. If the Si content exceeds 0.7 wt %, its effect is saturated and the merit of the addition of Si is lost. Therefore, the upper limit of the Si content is set to 0.7 wt %.

In a method of manufacturing a yoke according to the present invention, which is used in the stepping motor having the above-described arrangement, a plate material made of the Fe—Cr alloy having the aforesaid composition is worked on a press into a predetermined shape, followed by annealing, preferably between 700° C. and 1,200° C. Specifically, if the annealing temperature is less than 700° C., no substantial strain is removed and an improvement in the magnetic characteristic is not expected. As the magnetic annealing temperature is made higher, more strain is eliminated, and in the present invention, since the quality of the material to be used is controlled on the basis of the F value, the material has a stable ferrite structure. Accordingly, even if the annealing temperature is made high, no martensite is precipitated and the magnetic characteristic is improved (saturated at a constant value) However, if the annealing temperature exceeds 1,200° C., an annealing furnace is remarkably degraded and magnetic annealing itself becomes difficult. For this reason, the upper limit of the annealing temperature is set to 1,200° C. Since the Fe—Cr alloy which has the ferrite single-phase structure having the desired composition ratio is used for the yoke, an electrical resistivity p becomes 5–10 times that of SUY or SPC. Since eddy currents are inversely proportional to the electrical resistivity of the yoke, in the stepping motor according to the present invention, the occurrence of the eddy currents is minimized for example while an alternating-current magnetic field is present during the driving of the motor. Accordingly, its iron loss decreases and its output torque relative to its input power increases, so that a stepping motor of low power consumption can be realized. In addition, since the eddy currents are prevented from easily flowing, a reverse magnetic field decreases, and if the input current of the motor is constant, the total quantity of magnetic flux increases and the output torque of the motor increases. In other words, the same output torque can be obtained from a reduced amount of current which flows through the excitation coil, so that the copper loss of the motor can be decreased. Since the iron loss and the copper loss are decreased in this manner, the heat generation of the motor itself can be suppressed.

In addition, since the Fe—Cr alloy has good workability, conventional manufacturing facilities for Fe alloys can be used to form a yoke of predetermined shape. Since the compositions of individual materials are controlled on the basis of their F values the lower limits of which are set to 0, the ferrite structure of the Fe—Cr alloy is stable, and its workability is extremely good so that the Fe—Cr alloy can also be subjected to drawing.

For this reason, the Fe—Cr alloy can be used for both a stator yoke and a frame yoke. If a predetermined Fe—Cr alloy is used in at least part of either of such yokes, the characteristics of that part can be improved. In particular, it is most effective to use the aforesaid Fe—Cr alloy for the stator yoke which undergoes a large variation in magnetic flux density.

In general, when a yoke is to be manufactured from the Fe—Cr alloy having the aforesaid composition, a plate material is formed into a stator yoke having at least portions bent in the shape of comb-tooth-shaped magnetic poles, by press working, or a plate material is formed into a frame yoke by drawing. The strain of such yoke due to residual stress applied during the press working degrades the magnetic characteristics of the yoke. Specifically, an increase in coercive force (Hc) and a decrease in permeability ($\mu$) occur in the yoke. The increase in Hc leads to an increase in hysteresis loss, while the decrease in permeability leads to a decrease in magnetic flux density, so that output torque and efficiency which are motor characteristics are lowered, i.e., the effect of the use of the aforesaid Fe—Cr alloy cannot be fully utilized. Incidentally, the motor characteristics of a stepping motor manufactured by using yokes formed by press working according to the present invention are fully improved compared to a stepping motor using a conventional steel, such as SPC.

However, if magnetic annealing based on the present invention is applied to such a yoke, the strain of the yoke due to residual stress is removed and the recovery of the coercive force (Hc) and the permeability ($\mu$) is realized, so that the output torque and the efficiency of the stepping motor are improved.

The extent of this improvement is large compared to the conventional steels SUY and SPC. This is because a primary cause of a decrease in the magnetic flux density of such a conventional steel in an alternating-current magnetic field during motor driving is eddy currents which are not affected by magnetic annealing. It is generally known that hysteresis loss is proportional to the 1.6th power of magnetic flux density, and since the conventional steel whose magnetic flux density is lowered by eddy currents involves hysteresis loss smaller than that of the steel according to the present invention, the effect of magnetic annealing on the conventional steel is small. On the other hand, since the steel according to the present invention involves a far smaller eddy-current loss than the conventional steel, the magnetic flux density of the former steel is higher so that its hysteresis loss due to working becomes larger. In other words, because of the larger hysteresis loss, the effect of magnetic annealing on the steel according to the present invention becomes larger and the necessity of the magnetic annealing becomes higher.

BRIEF DESCRIPTION OF THE DRAWING

FIG. 2 an exploded perspective view showing the first embodiment of the stepping motor according to the present invention.

FIG. 3 is an exploded perspective view showing a second embodiment of the stepping motor according to the present invention.

FIG. 9 is an exploded perspective view showing a modification of the stepping motor according to the present invention.

FIG. 10 is an exploded perspective. view showing a modification of the stepping motor according to the present invention.

PREFERRED EMBODIMENTS OF THE INVENTION

Figure 1:
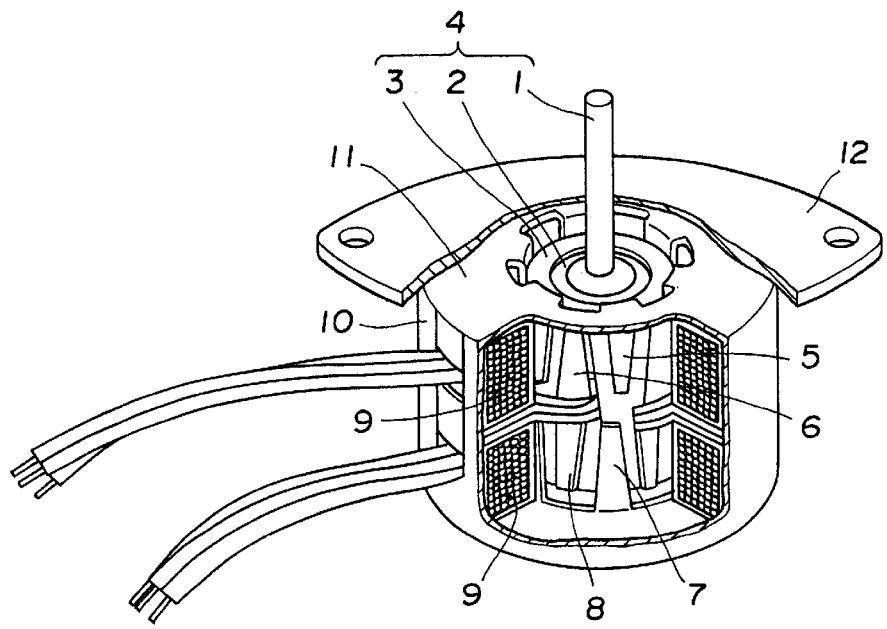
FIG. 1 is a partially cutaway perspective view showing a first embodiment of a stepping motor according to the present invention.

Preferred embodiments of the stepping motor according to the present invention and the method of manufacturing a yoke for use in it will be described below in detail with reference to the accompanying drawings. FIGS. 1 and 2 show a first embodiment of the stepping motor according to the present invention. As shown in FIGS. 1 and 2, a cylindrical permanent magnet 3 is integrally fixed to the periphery of a shaft 1 via a connecting member 2, thereby forming a rotor 4. The external circumference of the permanent magnet 3 is circumferentially magnetized to have multiple magnetic poles.

Since this example is a two-phase type of stepping motor, first to fourth stator yokes 5 to 8 are concentrically disposed around the rotor 4. Specifically, the first and second stator yokes 5 and 6 constitute a first phase, and the third and fourth stator yokes 7 and 8 constitute a second phase. The respective stator yokes 5 to 8 have comb-tooth-shaped magnetic poles 5b to 8b formed by bending the internal circumferential portions of flat-ring-shaped flange portions 5a to 8a by 90 degrees in predetermined directions. The paired stator yokes (5 and 6, 7 and 8) are assembled in such a manner that the tooth-edge sides of the comb-tooth-shaped magnetic poles 5b and 6b, 7b and 8b are opposed to each other so that the teeth of the comb-tooth-shaped magnetic poles 5b (7b) are respectively inserted into the spaces between the teeth of the comb-tooth-shaped magnetic poles 6b (8b). The electrical angle of the first phase and that of the second phase differ from each other by 90 degrees Excitation coils 9 each of which includes a coil portion 9b wound around a coil bobbin 9a are respectively fitted onto the external circumferential portions of the stator yoke pairs (5 and 6, 7 and 8), so that the excitation coils 9 are respectively interposed between the opposed flange portions (Sa and 6a, 7a and 8a).

A frame yoke 10 formed in the shape of a cup having a bottom is concentrically disposed to surround the rotor 4, the stator yokes 5 to 8 and the excitation coils 9. In other words, these components 4 to 9 are inserted in the frame yoke 10. In this state, the open end of the frame yoke 10 is covered with a cap 11.

The opposite end portions of the shaft 1 are respectively inserted through and rotatably supported by a through-hole 10a formed in the center of the bottom of the frame yoke 10 and a through-hole 11a formed in the cap 11. The end portion of the shaft 1 which is inserted through the through-hole 11a of the cap 11 projects therefrom by a predetermined length to serve as an output shaft. A flange 12 for fixing the stepping motor to a predetermined position of another device is integrally formed on the external face of the cap 11 (refer to FIG. 1). Incidentally, the aforesaid components are basically identical in shape and constitution to conventional ones. In this example, its rotor portion, its stator yoke portion and its frame yoke portion are respectively formed of independent components.

In the present invention, any of the four stator yokes 5 to 8 is formed of an Fe—Cr alloy which has a ferrite single-phase structure having a predetermined ratio. In addition, since the Fe—Cr alloy used in the present invention has extremely good workability and can be worked by drawing, the frame yoke 10 is also formed of an Fe—Cr alloy similar to the above-noted one.

Specifically, the Fe—Cr alloy essentially consists of Fe and contains 9.0–18.0 wt % Cr and trace additions which are not more than 0.02 wt % C, not more than 0.7 wt % Si, not more than 0.7 wt % Mn, not more than 0.04 wt % P, not more than 0.005 wt % S, not more than 0.5 wt % Ni, not more than 0.02 wt % N, not more than 0.01 wt % 0, not more than 4.0 wt % Al and not more than 0.4 wt % Ti, and the F value of the Fe—Cr alloy which is defined by the following expression is not less than 0 and not more than 8.

F value=Cr+Si+2.1(Al+Ti)−37.0(C+N)−2.0Ni−0.6Mn−10.8

(where the unit of each element is wt %.)

If no other elements are contained, the Fe content is the remainder of the Fe—Cr alloy obtained by determining the contents of the respective elements so as to satisfy the F value. However, in the present invention, trace components other than the aforesaid elements may be contained. If such a component is contained, the Fe content is reduced by the corresponding amount. Since the trace components are inevitable impurities, their contents cannot be strictly zero. However, if they can be substantially zero, trace components having no specific lower limit in content may not have to satisfy the F value. This description similarly applies to plus factors (elements each having the function of stabilizing the ferrite structure), such as Si, Al and Ti, in the expression for determining the F value.

Accordingly, eddy currents which tend to occur in a yoke owing to an alternating-current magnetic field during the driving of a motor can be suppressed as completely as possible, whereby the efficiency of the motor can be improved. In other words, if a product according to the present invention is used, the same output torque can be realized by a stepping motor the size of which is reduced by an amount corresponding to the improved efficiency. In addition, since the workability of such product is completely the same as that of a conventional Fe alloy from which to form a yoke, a die identical to that prepared for working the conventional Fe alloy can be used in a manufacturing process, for example, in press working.

FIG. 3 shows a second embodiment of the present invention. This embodiment differs from the above-described embodiment in that the present invention is applied to an example of a stepping motor including a yoke frame portion which is axially divided into parts for different phases. Specifically, the second stator yoke 6 (the third stator yoke 7) is fitted into an opening in the corresponding one of cup yokes 15 which are formed by drawing, and the respective excitation coils 9 are fitted into the spaces formed between the yokes 6 and 7 and the corresponding cup yokes 15. The upper and lower cup yokes 15 and 15 are butted on each other at a predetermined angular position and joined to each other by welding.

The openings formed in the central portions of the bottoms of the respective cup yokes 15 are closed by fitting flanges 12 and 12' fitted into such central portions. The rotor 4 is rotatably supported by bearings formed on the respective flanges 12 and 12'.

Specifically, each of the cup yokes 15 has a stator yoke portion formed by erecting comb-tooth-shaped magnetic poles 15b from the internal circumference of a ring-shaped flange 15a, as shown in FIG. 3. A cylindrical side wall, i.e., a frame yoke portion 15c, is formed around the external circumference of the flange 15a. In other words, in this example, the stator yoke portion and the frame yoke portion are formed by the same component (the cup yoke 15). In the present invention, the stator yoke portion, the frame yoke portion and the like need not necessarily be composed of separate components, as in the above-described embodiment, and it is possible to employ various other arrangements; for example, a plurality of yoke portions may be composed of one component, or one yoke portion may be composed of a plurality of components. Accordingly, the present invention can be applied to conventional various types of stepping motors.

Figure 4:
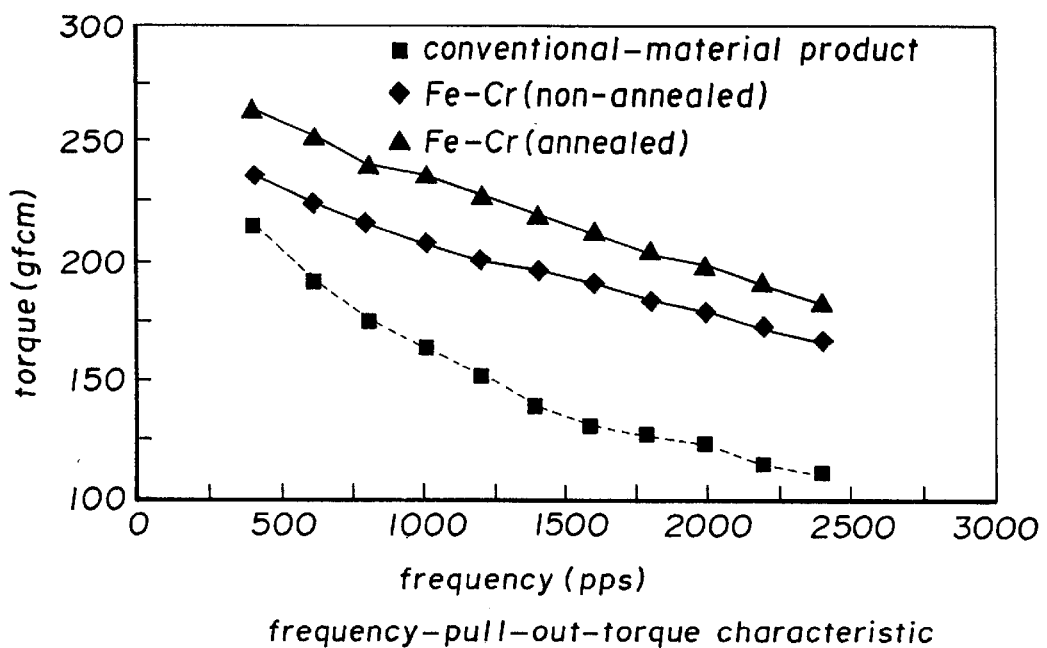
FIG. 4 is a characteristic diagram which demonstrates an effect of the present invention.
Figure 5:
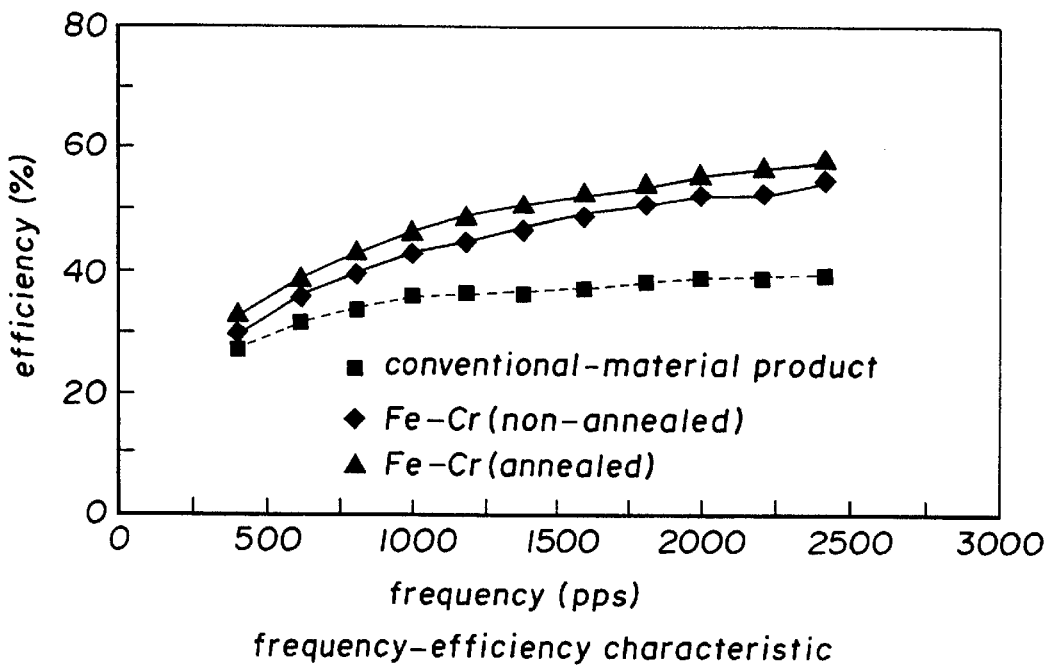
FIG. 5 is a characteristic diagram which demonstrates an effect of the present invention.

In the present invention, each of the second and third stators 6 and 7 and the cup yokes 15 is formed of the above-described Fe—Cr alloy having the predetermined composition ratio. Accordingly, it is possible to improve alternating-current magnetic characteristics at the second and third stator yokes 6 and 7 and the cup yokes 15 which form the magnetic path of an alternating-current magnetic field during the operation of the motor, whereby the characteristics of the whole motor can be improved, Result of Experiment To demonstrate the effect of the present invention, a motor according to the above-described first embodiment (shown in FIG. 2) and a conventional motor having the same shape as the first embodiment (there was a difference between the materials of the stator yokes of both motors) were manufactured, and their motor characteristics were evaluated. Both motors were driven under the condition of 2-phase excitation bipolar constant-current chopper driving. The result of the evaluation is shown in FIGS. 4 and 5 (square mark: conventional product, diamond-shaped mark: present inventive product). FIG. 4 shows pull-out torque characteristics plotted with respect to frequency, and FIG. 5 shows the corresponding efficiencies. As can be seen from FIG. 4, the torque of the stepping motor of the present invention is higher than that of the conventional motor, and as the driving frequency becomes higher, the difference in torque between the motors becomes greater. As can be seen from FIG. 5 the efficiencies of both motors show tendencies similar to their torque characteristics. Incidentally, the materials of the stator yokes used in the experiment were SPC in the case of the conventional product and a predetermined Fe—Cr alloy having an F value within a range of 2 to 6 in the case of the present inventive product. In addition, even in the case of another product having a different F value within the same range or containing a specific element in a different amount, the characteristics of the product were substantially similar to the shown characteristics.

Then, alternating-current magnetic characteristics at material levels for individual F values were obtained by using the F value as a parameter. Specifically, Fe—Cr alloys in each of which the contents of its respective elements were adjusted to obtain a predetermined F value were manufactured, and ring-shaped samples each having an external diameter of 25 mm and an internal diameter of 15 mm were cut out from 1-mm-thick steel plates of the respective Fe—Cr alloys. The ring-shaped samples were annealed at 850° C. for one hour, and their alternating-current magnetic characteristics were measured with a B-H analyzer under the conditions of a magnetic-field strength of 800 A/m and a frequency of 500 Hz.

Figure 6:
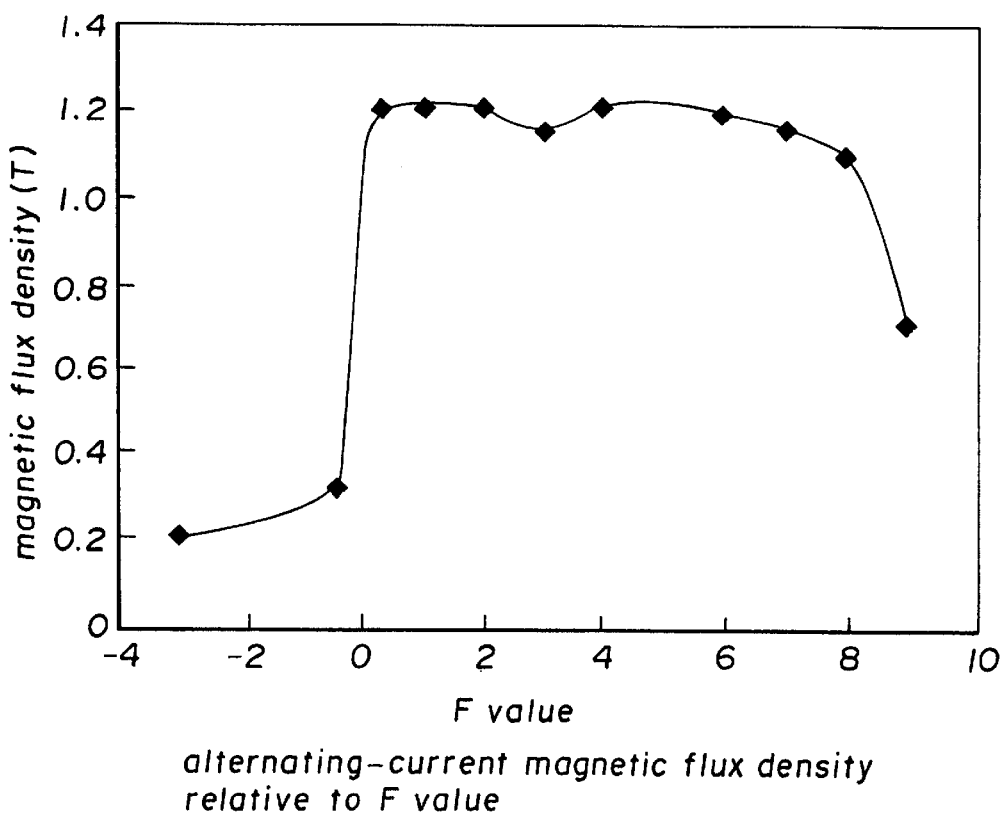
FIG. 6 is a graph showing the characteristic of an alternating-current magnetic flux density with respect to an F value.

From the result of the measurement, it has been found out that, as shown in FIG. 6, the magnetic flux density sharply rises at an F value of 0 and a high level of magnetic flux density is maintained up to an F value of approximately 8 (a peak value is approximately maintained, particularly up to an F value of 6), and if the F value exceeds 8, the magnetic flux density tends to fall. This indicates that the F value is preferably between 0 and 8. Incidentally, the reason why the samples were annealed as described above is that their characteristics can be improved by annealing, as will be described later in connection with the method of manufacturing a yoke according to the present invention, and that the tendencies of the characteristics of the respective samples are the same irrespective of whether they are annealed. Specifically, although not shown, the result of an experiment with annealed products showed that although the peak value of the F value lowered to approximately 0.8 [T], a similar tendency was obtained, i.e., the magnetic flux density sharply rose at an F value of 0 and a high magnetic flux density was maintained up to an F value of approximately 8, and if the F value exceeded 8, the magnetic flux density lowered.

Then, materials having different compositions were manufactured, and yokes using the materials were prepared to assemble stepping motors, and the performance of each of the materials was evaluated. Specifically, alloys having the compositions shown in Tables 1 to 3 were melted and subjected to hot rolling, cold rolling and final annealing, thereby preparing plates of 1-mm-thick. In Tables 1 to 3, a steel A-1 is a conventional steel, SUY, steels B-1 to B-26 are steels according to the present invention, and steels C-1 to C-9 are comparative steels. The steel A-1, after working, was subjected to conventional Ni plating for rust preventive treatment. In each of Tables 1 to 3, the columns of Ti, Al, Cr and Mn contain the amounts of the respective elements added. Although each of Tables 2 and 3 show that the amount of Ti added is 0 (indicated by "-" ), Ti is contained as an inevitable impurity as described previously, so that, strictly, an extremely small (unmeasurable) amount of Ti is originally contained. Similarly, since any of the amounts of the above-noted four elements listed in Tables 1 to 3 is a positively added amount, strictly, their actual contents are slightly larger than the respective values shown in the tables. However, the differences between the actual contents and the respective shown values are extremely small within the range of errors.

Tables 4 to 6 show the performance of each of the steels, i.e., magnetic flux density which is a direct-current magnetic characteristics, motor performance, anticorrosion characteristic and electrical resistivity. Incidentally, ring-shaped samples each having an external diameter of 45 mm and an internal diameter of 33 mm were cut out from 1-mm-thick plates of the respective steels, and the ring-shaped samples were annealed at 850° C. for one hour, and their direct-current magnetic characteristics were measured under various measurement conditions. Specifically, the direct-current magnetic characteristics were measured while changing the strength of a magnetic field to 400 A/m (B5), 800 A/m (B10) and 2,000 A/m (B25). The motor performance was evaluated by assembling stepping motors using yokes fabricated from the respective steels and comparing the motor performance of each of the stepping motors to that of the stepping motor using the conventional steel A-1. In the column of the motor performance, "x" represents a steel equal or inferior to the conventional steel A-1, and "O" represents a steel superior to the conventional steel A-1.

The anticorrosion characteristic was visually evaluated through a 24-hour salt-water spraying test conducted in accordance with JIS (Japanese Industrial Standard) Z 2371. In the column of the anticorrosion characteristic, "O" represents a steel on which substantial rust was not observed, and "x" represents a steel on which rust was observed at an area ratio of 10% of more. The electrical resistivity was measured by a Wheatsone bridge method using 1-mm-thick square plate samples each having sides of 500 mm.

As can be seen from Tables 4 and 5, each of the present inventive products showed high motor performance and a good anticorrosion characteristic as well as a high electrical resistivity independently of the differences in F value between specific values and the differences between composition ratios, as long as such differences were accommodated in predetermined ranges. Incidentally, since Ti contributes to the stability of the composition of a steel, the addition of Ti to steels generally tends to increase their electrical resistivities to a slight extent, as long as the F values of the steels are approximately equal.

In contrast, the conventional steel A-1 has a good direct-current magnetic characteristic and anticorrosion characteristic, but its electrical resistivity is as low as 9.8 $\mu\Omega$cm and eddy currents easily flow, so that the motor characteristic lowers. In addition, a rust preventive treatment step using Ni plating is indispensable to the steel A-1, and if the steel A-1 is subjected to rust preventive treatment, rust occurs. On the other hand, none of the present inventive products becomes rusty even if no special rust preventive treatment is used.

Any of the comparative steels C-1 to C-9, each of which contains elements identical to those of the present inventive steels with the content and/or F value of at least one of the elements being deviated from its predetermined range, shows a low direct-current magnetic characteristic and inferior motor performance. The respective steels C-1 and C-6 have electrical resistivities as high as 48.1 $\mu\Omega$cm and as high as 46.4 $\mu\Omega$cm, but their F values are less than 0 and their ferrite structures are inferior in stability and their magnetic characteristics are greatly inferior. In addition, since the Cr contents are 8.90 wt % (C-1) and 8.12 wt % (C-6), their anticorrosion characteristics are also inferior.

In the comparative steels C-3 to C-5, C-8 and C-9, any one of the C content, the N content and the Mn content is high, and their F values are less than 0. Their magnetic characteristics are, therefore, lowered. The magnetic characteristics of the steels C-5 and C-9 are lowered by their high oxygen (0) contents. The steels C-2 and C-7 have good anticorrosion characteristics owing to their high Cr contents, but since the respective Cr contents are excessively high at 19.52 wt % and 20.02 wt % and their F values are not less than 8, the magnetic characteristics are inferior and the motor characteristics are lowered.

An embodiment of the present inventive method of manufacturing a yoke having the above-described constitution will be described below. As described previously, regarding the stator yokes, the comb-tooth-shaped magnetic poles 5b to 8b are formed by bending the internal circumferential portions of the flat-ring-shaped flanges 5a to 8a, which are made from a predetermined Fe—Cr alloy plate, by 90 degrees in the predetermined directions by press working, as shown in FIG. 2 and others. The frame yoke and the cup yokes are formed into predetermined shapes by drawing. The magnetic characteristics of the respective yokes are degraded by residual stress applied during such working.

For this reason, according to the present invention, after such press working, annealing is performed in a predetermined atmosphere at a predetermined temperature. Specifically, it is preferably to perform annealing in an atmosphere of an inert gas such as argon or nitrogen, or in a vacuum. The result of an experiment has shown that the temperature preferably is in a range of 700° C. to 1,200° C.

Specifically, to obtain temperature conditions optimum for annealing, the magnetic flux densities of yoke materials were measured by using the annealing temperature as a parameter. In this experiment intended to evaluate the characteristic of the yoke materials themselves, each predetermined material was formed into the shape of a flat ring, i.e., a shape identical to any of the flanges of the stator yokes (internal diameter: 15 mm, external diameter: 25 mm, thickness: 1 mm), and the obtained product was folded into two halves at right angles by press working. In this manner, stress (residual stress) occurring during the formation of the aforesaid comb-tooth-shaped magnetic poles was applied artificially. The materials used had predetermined composition ratios having stable and good magnetic characteristics and F values of 2 to 6. Although the experiment was performed with such materials of different kinds having different compositions, any of the materials exhibited the shown characteristics, and characteristic changes due to the differences between the compositions were not observed.

Figure 7:
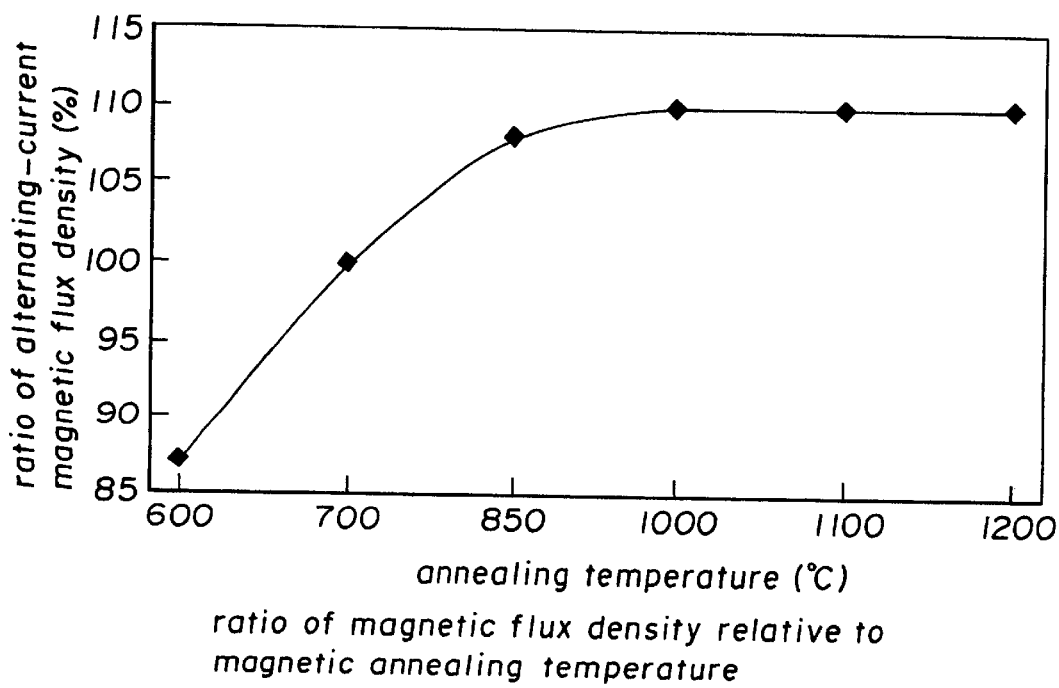
FIG. 7 a graph showing the characteristic of the ratio of an alternating-current magnetic flux density with respect to an annealing temperature.

The alternating-current magnetic characteristics of the rings folded in the above-described manner were measured with a B-H analyzer under the conditions of a magnetic-field strength of 800 A/m and a frequency of 500 Hz. FIG. 7 shows the ratios of magnetic flux density which were obtained at different annealing temperatures through the measurement. In FIG. 7, 100% indicates the magnetic flux density (1.05 [T]) at 700° C. which is not less than 1.3 times the maximum magnetic density (0.8[T]) obtained by annealing the conventional material SUY. The maximum magnetic flux density of SUY is the value obtained when annealing was performed at an annealing temperature higher than 700° C. (for example, at approximately 1,000° C.). If the magnetic flux density of the steel according to the present invention is compared with the magnetic flux density (less than 0.8 [T]) of the conventional steel annealed at 700° C., the ratio of characteristic improvement by the present invention is far higher than the ratio of characteristic improvement in the conventional steel.

As is apparent from FIG. 7, if the annealing temperature reaches 1,000° C., the ratio of the maximum magnetic flux density reaches a saturation level of 110% (1.15 [T]), while as the annealing temperature becomes lower, the magnetic flux density tends to become lower. It has also been found out that if the steel according to the present invention is annealed at an annealing temperature of 700° C or more, its strain is fully removed and its magnetic characteristics are improved. Incidentally, the experiment was performed up to an annealing temperature of 1,200° C., because, as described previously, if the annealing temperature exceeds 1,200° C., annealing itself becomes difficult owing to external causes.

Figure 8:
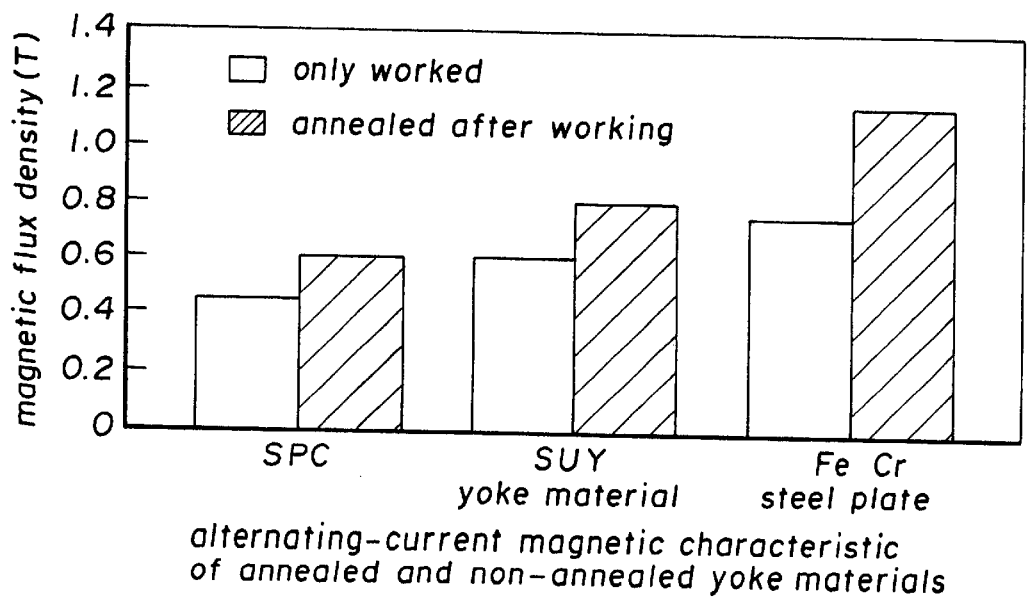
FIG. 8 is a graph showing the relationships between the alternating-current magnetic characteristics of annealed and non-annealed conventional steels and those of annealed and non-annealed steels according to the present invention.

FIG. 8 shows the degradation of the magnetic flux density of the alternating-current magnetic characteristic of each yoke material due to the working thereof and the level of recovery of its magnetic characteristic due to annealing The yoke materials were annealed at 850° C. for one hour, and their alternating-current magnetic characteristics were measured under the conditions of a magnetic-field strength of 800 A/m and a frequency of 500 Hz. In addition, non-annealed and annealed plates bent in the above-described manner to apply artificial stresses were prepared and their magnetic characteristics were measured.

As can be seen from FIG. 8, the Fe—Cr alloy recovered its magnetic characteristics owing to annealing after working to the greatest extent of the three yoke materials, and it is, therefore, highly desirable to anneal the Fe—Cr alloy. Specifically, the magnetic flux density of the steel according to the present invention was 50% increased by the annealing with respect to an about 33% increase in the magnetic flux density of each of the conventional steels SUY and SPC. Accordingly, it is recognized that the annealing of the Fe—Cr alloy is more effective than that of the other conventional alloys.

In addition, a product, which were identical in material composition and dimensional structure to the aforesaid non-annealed present inventive product represented by the diamond-shaped marks in FIGS. 4 and 5, were prepared and a comb-tooth-shaped magnetic poles were formed on the product by press working, and the obtained yoke was annealed at 850° C. for 0.5 hour. As shown by triangular marks in FIGS. 4 and 5, both the pull-out torque characteristic and the efficiency of the motor using the annealed yoke were improved to a great extent compared to the non-annealed yoke.

Incidentally, in each of the above-described embodiments, any of the yokes is formed of a predetermined Fe—Cr alloy. However, the Fe—Cr alloy may be used not for all the yokes but for part of the yokes. For example, the frame yoke which does not undergo a large variation in magnetic flux density may also be formed of a conventional Fe-alloy.

Specifically, as shown in FIG. 9, a frame 10' may be made of an Fe alloy, and particular stator yokes (in the shown example, stator yokes 5' and 6') may be made of the Fe-alloy and the other stator yokes 7 and 8 may be made of a predetermined Fe—Cr alloy.

As shown in FIG. 10, in the structure of the second embodiment shown in FIG. 3, a cup yoke 15' may be made of an Fe alloy and only the intermediate stator yokes 6 and 7 may be made of a Fe—Cr alloy.

In either of the arrangements, since the Fe—Cr alloy is used for part of the stator yokes, the occurrence of eddy currents can be suppressed in the part of the stator yokes for which the Fe—Cr alloy is used, whereby the aforementioned characteristics are improved compared to conventional products. Actual experiments performed to evaluate the characteristics of such yokes showed that the characteristics of any of the yokes were improved up to approximately ½ of the characteristics of the inventive products shown in FIGS. 4 and 5 (intermediate characteristics between the characteristics of the inventive products and those of the conventional products)

If only a particular stator yoke or yokes are to be manufactured from an Fe—Cr alloy in the above-described manner, a stator yoke or yokes for which to use the Fe—Cr alloy are not limited to those in either of the shown embodiments, and arbitrary stator yokes may be combined. In addition, a portion of a particular stator yoke or yokes which corresponds to comb-tooth-shaped magnetic poles may be made of an Fe—Cr alloy. In other words, the phrase "part of the stator yoke(s)" used herein represents a concept which contains not only "part of a plurality of stator yokes which constitute a stepping motor" , as in the case of each of the above-described embodiments, but also "part of a particular stator yoke". In addition, although not shown, all the stator yokes of a stepping motor may be formed of a predetermined Fe—Cr alloy, and its frame yoke may be formed of an Fe alloy similarly to conventional frame yokes.

As described above, in a stepping motor according to the present invention, since part of its yokes are formed of a predetermined Fe—Cr alloy, the occurrence of eddy currents can be minimized so that iron loss due to the eddy currents can be reduced and the efficiency of the motor is improved. In addition, since the Fe—Cr alloy has a rust preventive effect, no special plating or coating is needed, so that the number of working steps can be reduced. In addition, since the contents of trace components are respectively set to predetermined values and the quality of each material is controlled on the basis of its F value, a ferrite single-phase structure having a stable composition can be obtained and the quality and workability of the material can be improved. Accordingly, the material can be worked by drawing, so that conventional manufacturing processes and facilities can be used without modification. Accordingly, an high-output stepping motor can be realized. In addition, since the ferrite structure is stable, annealing at a high annealing temperature can be executed without involving the occurrence of martensite.

In a method of manufacturing a yoke according to the present invention, its magnetic characteristics degraded by press working can be recovered, so that the effect of the use of the Fe—Cr alloy can be improved to a further extent

TABLE 1

Chemical Composition & F Value (wt %)

| S. No. | C | Si | Mn | P | S | Ni | Cr | N | Al | Ti | O | F Value |
|---|---|---|---|---|---|---|---|---|---|---|---|---|
| Conventional Steel | | | | | | | | | | | | |
| A-1 | 0.010 | ≦0.02 | 0.30 | 0.015 | 0.005 | — | — | 0.009 | 0.04 | — | 0.0025 | |
| Inventive Steel | | | | | | | | | | | | |
| B-1 | 0.010 | 0.61 | 0.16 | 0.031 | 0.003 | 0.15 | 11.09 | 0.007 | 0.02 | 0.19 | 0.0027 | 0.32 |
| B-2 | 0.017 | 0.67 | 0.10 | 0.928 | 0.003 | 0.10 | 11.65 | 0.012 | 0.07 | 0.22 | 0.0010 | 0.80 |
| B-3 | 0.012 | 0.58 | 0.15 | 0.030 | 0.002 | 0.14 | 11.54 | 0.010 | 0.10 | 0.25 | 0.0024 | 0.87 |
| B-4 | 0.014 | 0.64 | 0.12 | 0.029 | 0.004 | 0.17 | 11.80 | 0.011 | 0.09 | 0.31 | 0.0031 | 1.14 |
| B-5 | 0.013 | 0.68 | 0.18 | 0.031 | 0.002 | 0.24 | 11.72 | 0.010 | 0.15 | 0.37 | 0.0027 | 1.25 |
| B-6 | 0.012 | 0.51 | 0.29 | 0.029 | 0.002 | 0.14 | 11.41 | 0.009 | 0.70 | 0.19 | 0.0052 | 1.76 |
| B-7 | 0.011 | 0.49 | 0.31 | 0.031 | 0.004 | 0.18 | 11.32 | 0.008 | 1.52 | 0.21 | 0.0039 | 3.39 |
| B-8 | 0.013 | 0.58 | 0.45 | 0.027 | 0.003 | 0.25 | 10.97 | 0.009 | 2.80 | 0.20 | 0.0042 | 5.47 |
| B-9 | 0.017 | 0.57 | 0.42 | 0.031 | 0.002 | 0.24 | 11.61 | 0.014 | 3.71 | 0.22 | 0.0031 | 7.75 |
| B-10 | 0.012 | 0.65 | 0.20 | 0.031 | 0.002 | 0.32 | 12.01 | 0.008 | 0.06 | 0.26 | 0.0017 | 1.03 |
| B-11 | 0.007 | 0.61 | 0.10 | 0.031 | 0.004 | 0.13 | 13.40 | 0.012 | 0.05 | 0.24 | 0.0018 | 2.80 |
| B-12 | 0.009 | 0.61 | 0.12 | 0.027 | 0.002 | 0.22 | 15.89 | 0.007 | 0.24 | 0.27 | 0.0020 | 5.60 |
| B-13 | 0.012 | 0.54 | 0.34 | 0.021 | 0.004 | 0.13 | 17.45 | 0.005 | 0.22 | 0.24 | 0.0019 | 7.06 |
| B-14 | 0.010 | 0.64 | 0.58 | 0.022 | 0.003 | 0.14 | 11.78 | 0.007 | 0.07 | 0.23 | 0.0024 | 0.99 |
| B-15 | 0.012 | 0.54 | 0.32 | 0.029 | 0.002 | 0.29 | 11.52 | 0.008 | 0.04 | 0.24 | 0.0072 | 0.34 |
| B-16 | 0.014 | 0.57 | 0.29 | 0.031 | 0.004 | 0.28 | 11.58 | 0.010 | 0.07 | 0.22 | 0.0084 | 0.34 |

TABLE 2

Chemical Composition & F Value (wt %)

| S. No. | C | Si | Mn | P | S | Ni | Cr | N | Al | Ti | O | F Value |
|---|---|---|---|---|---|---|---|---|---|---|---|---|
| Inventive Steel | | | | | | | | | | | | |
| B-17 | 0.006 | 0.64 | 0.12 | 0.026 | 0.002 | 0.07 | 9.80 | 0.004 | 0.50 | — | 0.0020 | 0.11 |
| B-18 | 0.007 | 0.53 | 0.10 | 0.028 | 0.001 | 0.10 | 11.96 | 0.004 | 0.10 | — | 0.0032 | 1.23 |
| B-19 | 0.009 | 0.57 | 0.48 | 0.027 | 0.003 | 0.12 | 12.91 | 0.008 | 0.90 | — | 0.0028 | 3.41 |
| B-20 | 0.007 | 0.25 | 0.55 | 0.023 | 0.002 | 0.18 | 13.05 | 0.004 | 1.68 | — | 0.0031 | 4.93 |
| B-21 | 0.011 | 0.20 | 0.51 | 0.029 | 0.003 | 0.25 | 13.01 | 0.010 | 2.45 | — | 0.0015 | 5.97 |
| B-22 | 0.010 | 0.22 | 0.65 | 0.027 | 0.002 | 0.26 | 12.65 | 0.009 | 3.48 | — | 0.0012 | 7.78 |
| B-23 | 0.006 | 0.44 | 0.22 | 0.032 | 0.004 | 0.12 | 14.03 | 0.004 | 0.15 | — | 0.0025 | 3.24 |
| B-24 | 0.009 | 0.54 | 0.49 | 0.031 | 0.003 | 0.24 | 15.02 | 0.006 | 0.09 | — | 0.0028 | 3.62 |
| B-25 | 0.007 | 0.36 | 0.16 | 0.027 | 0.002 | 0.22 | 16.33 | 0.006 | 0.05 | — | 0.0019 | 4.98 |
| B-26 | 0.008 | 0.53 | 0.44 | 0.027 | 0.003 | 0.19 | 17.34 | 0.005 | 0.04 | — | 0.0038 | 6.03 |

TABLE 3

Chemical Composition & F Value (wt %)

| S. No. | C | Si | Mn | P | S | Ni | Cr | N | Al | Ti | O | F Value |
|---|---|---|---|---|---|---|---|---|---|---|---|---|
| Comparative Steel | | | | | | | | | | | | |
| C-1 | 0.015 | 0.41 | 0.52 | 0.021 | 0.005 | 0.11 | 8.90 | 0.010 | 0.02 | 0.20 | 0.0022 | −2.48 |
| C-2 | 0.011 | 0.49 | 0.19 | 0.027 | 0.003 | 0.14 | 19.52 | 0.008 | 0.12 | 0.23 | 0.0023 | 8.85 |

TABLE 3-continued

Chemical Composition & F Value (wt %)

| S. No. | C | Si | Mn | P | S | Ni | Cr | N | Al | Ti | O | F Value |
|---|---|---|---|---|---|---|---|---|---|---|---|---|
| C-3 | 0.025 | 0.60 | 0.20 | 0.031 | 0.004 | 0.28 | 11.15 | 0.020 | 0.07 | 0.21 | 0.0034 | -0.81 |
| C-4 | 0.017 | 0.54 | 0.79 | 0.021 | 0.002 | 0.31 | 11.05 | 0.012 | 0.01 | 0.20 | 0.0026 | -0.94 |
| C-5 | 0.022 | 0.64 | 0.44 | 0.031 | 0.003 | 0.19 | 11.24 | 0.007 | 0.09 | 0.21 | 0.0120 | -0.38 |
| C-6 | 0.015 | 0.55 | 0.42 | 0.031 | 0.003 | 0.09 | 8.12 | 0.010 | 0.09 | — | 0.0022 | -3.30 |
| C-7 | 0.011 | 0.71 | 0.55 | 0.026 | 0.004 | 0.17 | 20.02 | 0.007 | 0.20 | — | 0.0017 | 9.01 |
| C-8 | 0.023 | 0.53 | 0.88 | 0.029 | 0.005 | 0.14 | 12.34 | 0.016 | 0.04 | — | 0.0057 | -0.10 |
| C-9 | 0.027 | 0.51 | 0.91 | 0.024 | 0.007 | 0.25 | 12.55 | 0.020 | 0.07 | — | 0.0112 | -0.38 |

TABLE 4

Characteristics of Steels

| | DC Magnetic Characteristics Magnetic Flux Density | | | Moter | Anti-corro- | Electric Resistivity |
|---|---|---|---|---|---|---|
| S. No | B5(T) | B10(T) | B25(T) | Property | sion | ($\mu\Omega \cdot$ cm) |
| Conventional Steel | | | | | | |
| A-1 Inventive Steel | 1.51 | 1.57 | 1.66 | x | o | 9.8 |
| B-1 | 1.23 | 1.34 | 1.42 | o | o | 62.4 |
| B-2 | 1.20 | 1.32 | 1.41 | o | o | 67.7 |
| B-3 | 1.19 | 1.31 | 1.41 | o | o | 63.8 |
| B-4 | 1.20 | 1.32 | 1.41 | o | o | 64.9 |
| B-5 | 1.20 | 1.32 | 1.41 | o | o | 65.6 |
| B-6 | 1.19 | 1.32 | 1.40 | o | o | 68.2 |
| B-7 | 1.18 | 1.31 | 1.39 | o | o | 86.7 |
| B-8 | 1.18 | 1.31 | 1.38 | o | o | 116.7 |
| B-9 | 1.13 | 1.25 | 1.34 | o | o | 122.6 |
| B-10 | 1.20 | 1.32 | 1.41 | o | o | 65.1 |
| B-11 | 1.17 | 1.29 | 1.38 | o | o | 67.7 |
| B-12 | 1.12 | 1.25 | 1.34 | o | o | 74.9 |
| B-13 | 1.07 | 1.21 | 1.30 | o | o | 77.4 |
| B-14 | 1.20 | 1.32 | 1.41 | o | o | 64.7 |
| B-15 | 1.20 | 1.32 | 1.41 | o | o | 62.8 |
| B-16 | 1.20 | 1.32 | 1.41 | o | o | 63.5 |

TABLE 5

Characteristics of Steels

| | DC Magnetic Characteristics Magnetic Flux Density | | | Moter | Anti-corro- | Electric Resistivity |
|---|---|---|---|---|---|---|
| S. No | B5(T) | B10(T) | B25(T) | Property | sion | ($\mu\Omega \cdot$ cm) |
| Inventive Steel | | | | | | |
| B-17 | 1.22 | 1.33 | 1.42 | o | o | 56.6 |
| B-18 | 1.20 | 1.32 | 1.41 | o | o | 64.7 |
| B-19 | 1.18 | 1.31 | 1.39 | o | o | 74.3 |
| B-20 | 1.13 | 1.25 | 1.34 | o | o | 78.4 |
| B-21 | 1.12 | 1.25 | 1.34 | o | o | 84.7 |
| B-22 | 1.12 | 1.24 | 1.34 | o | o | 93.9 |
| B-23 | 1.17 | 1.29 | 1.37 | o | o | 68.8 |
| B-24 | 1.12 | 1.25 | 1.34 | o | o | 71.4 |
| B-25 | 1.13 | 1.25 | 1.34 | o | o | 74.1 |
| B-26 | 1.12 | 1.24 | 1.34 | o | o | 79.9 |

TABLE 6

Characteristics of Steels

| | DC Magnetic Characteristics Magnetic Flux Density | | | Moter | Anti-corro- | Electric Resistivity |
|---|---|---|---|---|---|---|
| S. No | B5(T) | B10(T) | B25(T) | Property | sion | ($\mu\Omega \cdot$ cm) |
| Comparative Steel | | | | | | |
| C-1 | 0.06 | 0.22 | 0.48 | x | x | 48.1 |
| C-2 | 0.61 | 0.77 | 0.90 | x | o | 80.0 |
| C-3 | 0.07 | 0.29 | 0.64 | x | o | 62.9 |
| C-4 | 0.04 | 0.19 | 0.59 | x | o | 61.5 |
| C-5 | 0.05 | 0.23 | 0.55 | x | o | 63.7 |
| C-6 | 0.04 | 0.20 | 0.45 | x | x | 46.4 |
| C-7 | 0.59 | 0.72 | 0.86 | x | o | 85.1 |
| C-8 | 0.07 | 0.30 | 0.62 | x | o | 65.0 |
| C-9 | 0.06 | 0.25 | 0.54 | x | o | 65.5 |

What is claimed is:

1. A stepping motor comprising:

a rotor made from a permanent magnet magnetized to have multiple magnetic poles, a stator yoke having a plurality of comb-tooth-shaped magnetic poles and opposed coaxially to the rotor, an excitation coil fitted on an external circumference of said comb-tooth-shaped magnetic poles of said stator yoke, and a tube-shaped frame yoke which surrounds said excitation coil and said stator yoke, wherein at least part of said stator yoke and said frame yoke is formed of an Fe—Cr alloy consisting essentially of:

Fe;

9.0–18.0 wt % Cr; and trace additions which are:

0.006–0.02 wt % C, not more than 0.7 wt % Si, not more than 0.7 wt % Mn, not more than 0.04 wt % P, not more than 0.005 wt % S, not more than 0.5 wt % Ni, not more than 0.02 wt % N, not more than 0.01 wt % O, 1–4.0 wt % Al and 0.01–0.4 wt % Ti, the Fe—Cr alloy having a ferrite single-phase structure whose F value defined by the following expression is not less than 0 and not more than 8:

F value=Cr+Si+2.1(Al+Ti)−37.0(C+N)−2.0Ni−0.6Mn−10.8.

2. A stepping motor comprising:

a rotor made from a permanent magnet magnetized to have multiple magnetic poles, a stator yoke having a plurality of comb-tooth-shaped magnetic poles and opposed coaxially to the rotor, an excitation coil fitted on an external circumference of said comb-tooth-shaped magnetic poles of said stator yoke, and a tube-shaped frame yoke which surrounds said excitation coil and said stator yoke, wherein at least part of said stator yoke and said frame yoke is formed of an Fe—Cr alloy consisting of:
Fe;
9.0–18.0 wt % Cr; and
trace additions which are:
  0,006–0.02 wt % C,
  not more than 0.7 wt % Si,
  not more than 0.7 wt % Mn,
  not more than 0.04 wt % P,
  not more than 0.005 wt % S,
  not more than 0.5 wt % Ni,
  not more than 0.02 wt % N,
  not more than 0.01 wt o,
  1–4.0 wt % Al and
  0.01–0.4 wt % Ti,
the Fe—Cr alloy having a ferrite single-phase structure whose F value defined by the following expression is not less than 0 and not more than 8:

$$F\ value = Cr + Si + 2.1(Al+Ti) - 37.0(C+N) - 2.0Ni - 0.6Mn - 10.8.$$

3. A stepping motor according to claim 1, wherein said Fe—Cr alloy comprises 0.19–0.4 wt.% Ti.

4. A stepping motor according to claim 1, wherein said Fe—Cr alloy comprises 0.004–0.02 wt % N.

5. A stepping motor according to claim 1, wherein said Fe—Cr alloy comprises an amount of C plus N of 0.01–0.04 wt %.

6. A stepping motor according to claim 1, wherein said Ti forms carbide with said C and nitride with said N and improves the stability of said ferrite single-phase structure.

7. A stepping motor comprising:

a rotor made from a permanent magnet magnetized to have multiple magnetic poles, a stator yoke having a plurality of comb-tooth-shaped magnetic poles and opposed coaxially to the rotor, an excitation coil fitted on an external circumference of said comb-tooth-shaped magnetic poles of said stator yoke, and a tube-shaped frame yoke which surrounds said excitation coil and said stator yoke, wherein at least part of said stator yoke and said frame yoke is formed of an Fe—Cr alloy consisting essentially of:
Fe;
9.0–18.0 wt % Cr; and
trace additions which are:
  0.006–0.02 wt % C,
  not more than 0.7 wt % Si,
  not more than 0.7 wt % Mn,
  not more than 0.04 wt % P,
  not more than 0.005 wt % S,
  not more than 0.5 wt % Ni,
  not more than 0.02 wt % N,
  not more than 0.01 wt % O,
  not more than 4.0 wt % Al and
  0.01–0.4 wt % Ti,
wherein a N/C ratio of said Fe—Cr alloy is less than 1.7,
the Fe—Cr alloy having a ferrite single-phase structure whose F value defined by the following expression is not less than 0 and not more than 8:

$$F\ value = Cr + Si + 2.1(Al+Ti) - 37.0(C+N) - 2.0Ni - 0.6Mn - 10.8.$$

8. A stepping motor comprising:

a rotor made from a permanent magnet magnetized to have multiple magnetic poles, a stator yoke having a plurality of comb-tooth-shaped magnetic poles and opposed coaxially to the rotor, an excitation coil fitted on an external circumference of said comb-tooth-shaped magnetic poles of said stator yoke, and a tube-shaped frame yoke which surrounds said excitation coil and said stator yoke, wherein at least part of said stator yoke and said frame yoke is formed of an Fe—Cr alloy consisting of:
Fe;
9.0–18.0 wt % Cr; and
trace additions which are:
  0.006–0.02 wt % C,
  not more than 0.7 wt % Si,
  not more than 0.7 wt % Mn,
  not more than 0.04 wt % P,
  not more than 0.005 wt % S,
  not more than 0.5 wt % Ni,
  not more than 0.02 wt % N,
  not more than 0.01 wt % O,
  not more than 4.0 wt % Al and
  0.01–0.4 wt % Ti,
wherein a N/C ratio of said Fe—Cr alloy is less than 1.7,
the Fe—Cr alloy having a ferrite single-phase structure whose F value defined by the following expression is not less than 0 and not more than 8:

$$F\ value = Cr + Si + 2.1(Al+Ti) - 37.0(C+N) - 2.0Ni - 0.6Mn - 10.8.$$

* * * * *